United States Patent
Kese et al.

[11] Patent Number: 5,884,198
[45] Date of Patent: Mar. 16, 1999

[54] BODY CONFORMAL PORTABLE RADIO AND METHOD OF CONSTRUCTING THE SAME

[75] Inventors: Scott Kese, Goode; Richard Culbertson; John Yoon, both of Lynchburg, all of Va.

[73] Assignee: Ericsson, Inc., Research Triangle Park, N.C.

[21] Appl. No.: 699,021

[22] Filed: Aug. 16, 1996

[51] Int. Cl.$^6$ ........................................ H04B 1/38
[52] U.S. Cl. ........................... 455/575; 455/90; 455/100; 343/702
[58] Field of Search ................. 455/575, 73, 90, 455/100, 269, 344, 351, 347, 121; 343/702

[56] References Cited

U.S. PATENT DOCUMENTS

| | | |
|---|---|---|
| 3,868,573 | 2/1975 | Holcomb et al. . |
| 4,041,394 | 8/1977 | Pate ......................................... 455/100 |
| 4,412,106 | 10/1983 | Pavel . |
| 5,093,929 | 3/1992 | Stolarczyk et al. ................. 455/344 X |
| 5,487,181 | 1/1996 | Dailey et al. . |

FOREIGN PATENT DOCUMENTS 2 036 447  6/1980  United Kingdom .

OTHER PUBLICATIONS

King: "Characteristics of Body–Mounted Antennas for Personal Radio Sets" IEEE Transactions on Antennas and Propagation, Mar., 1975, pp. 242–244, XP002048328, see p. 242, col. 1; figure 2.

*Primary Examiner*—Thanh Cong Le
*Attorney, Agent, or Firm*—Nixon & Vanderhye PC

[57] ABSTRACT

The components of a portable radio are distributed over a user's body to utilize the user's body as a vehicle for carrying the radio. A patch antenna mounted across a user's shoulder improves the user's ability to receive and transmit by minimizing body shielding effects. A control unit including a talk button, display, key pad and speaker is mountable to the user's other shoulder in close proximity to a user's ear and mouth for faster and more efficient communication. The power supply includes a plurality of battery packs that are mountable about the user's waist. The radio components are thus positioned to optimize their use while efficiently and comfortably utilizing the user's body to support the radio.

25 Claims, 3 Drawing Sheets

BODY CONFORMAL PORTABLE RADIO AND METHOD OF CONSTRUCTING THE SAME

BACKGROUND

The present invention relates to mobile communication devices and, in particular, to a portable radio that has its components distributed about a user's body, utilizing the body as a vehicle to carry the radio.

People who serve the public such as police officers, fire fighters, utilities personnel and the like, require portable mobile communication devices in order to perform their job. Although existing portable radio technology is smaller and more convenient than in the past, existing technology suffers from several drawbacks. For example, as duty shifts increase to twelve hours and longer, battery power must be increased correspondingly to enable lasting communication devices. On current radios, however, added battery power is typically achieved using a cumbersome and unbalanced mass attached to the radio itself. Moreover, when a radio is worn on the user's hip, the user's body can get in the way of the antenna and interfere with the signal. Some radios attach the antenna to the shoulder speaker mic, but since the antenna projects upward and must be worn outside the clothing, it can get in the way or get caught.

Still further, radios that are worn on a user's hip can be difficult to access quickly and are far away from the user's ear, sometimes resulting in missed communications.

SUMMARY OF THE INVENTION

It is therefore an object of the invention to provide a portable communication device that overcomes the drawbacks associated with conventional portable radios. It is another object of the invention to provide a portable radio that distributes the radio components and the components' weight on a user's body and utilizes the user's body as a vehicle for carrying a radio.

In this regard, the radio according to the present invention includes a power supply having a battery that is separated into modules mountable in the vicinity of a user's waist. Moreover, the radio according to the present invention utilizes a patch antenna that fits the human form mounted over front and back sides of a user's shoulder. In this shape and position, the patch antenna eliminates human interference of an incoming signal. Finally, the speaker and microphone are moved to a user's opposite shoulder in the vicinity of the user's ear and mouth to increase access time and prevent missed communications.

The above-mentioned and other objects according to the invention are achieved by providing a portable radio including a transceiver, a patch antenna attached to the transceiver and mountable on a first shoulder of a user, a control unit spaced from and operatively coupled with the transceiver and mountable on a user's second shoulder, and a power supply spaced from and operatively coupled with the transceiver and mountable in the vicinity of a user's waist. The control unit includes at least one of a talk button, a display, a key pad, a microphone and a speaker.

The patch antenna preferably includes two spaced patches connected by a shoulder strap such that the two spaced patches are mountable over both front and back sides of the user's first shoulder. The control unit may be bent at an intermediate portion thereof, and the power supply may include at least two battery packs mountable on opposite sides of the user's waist. The radio may further include a user wearable vest supporting the transceiver, patch antenna, control unit and power supply in respective positions on the user's body. A remote mic activator unit may also be provided for remotely activating the control unit. Other auxiliary devices may be operatively coupled with the transceiver, including a GPS unit, a heart rate monitor, night vision goggles, a parabolic microphone, a stun gun, or the like. The unit may also include a helmet suite coupled with the transceiver that has a helmet display for displaying radio parameters and a speaker disposed adjacent a user's ear.

In accordance with another aspect of the invention, there is provided a harness portable radio that is configured to conform to a user's body that includes a vest having a first shoulder section, a second shoulder section, a front portion and a back portion, a patch antenna attached to the first shoulder section, a transceiver attached to the patch antenna, a control unit spaced from and operatively coupled with the transceiver and attached to the second shoulder section, and a power supply spaced from and operatively coupled with the transceiver and attached to one of the front portion and the back portion in the vicinity of a user's waist.

In accordance with still another aspect of the invention, there is provided a method of constructing the portable radio according to the invention. The method includes the steps of (a) providing a wearable support having a first shoulder section, a second shoulder section, a front portion and a back portion, (b) attaching a patch antenna to the first shoulder section, (c) attaching a transceiver to the patch antenna, (d) operatively coupling the control unit with the transceiver and attaching the control unit to the second shoulder section, and (e) operatively coupling the power supply with the transceiver and attaching the power supply to one of the front portion and the back portion in the vicinity of a user's waist. Step (b) may be practiced by providing two patches connected by a shoulder strap and attaching the shoulder strap to the first shoulder section, such that the two spaced patches are mountable over both the front portion and the back portion surrounding the first shoulder section. Step (e) may be practiced by attaching a plurality of battery packs about the front portion and the back portion in the vicinity of the user's waist.

BRIEF DESCRIPTION OF THE DRAWINGS

These and other aspects and advantages of the present invention will be described in detail with reference to the accompanying drawings, in which.

DETAILED DESCRIPTION OF PREFERRED EMBODIMENTS

Figure 1:
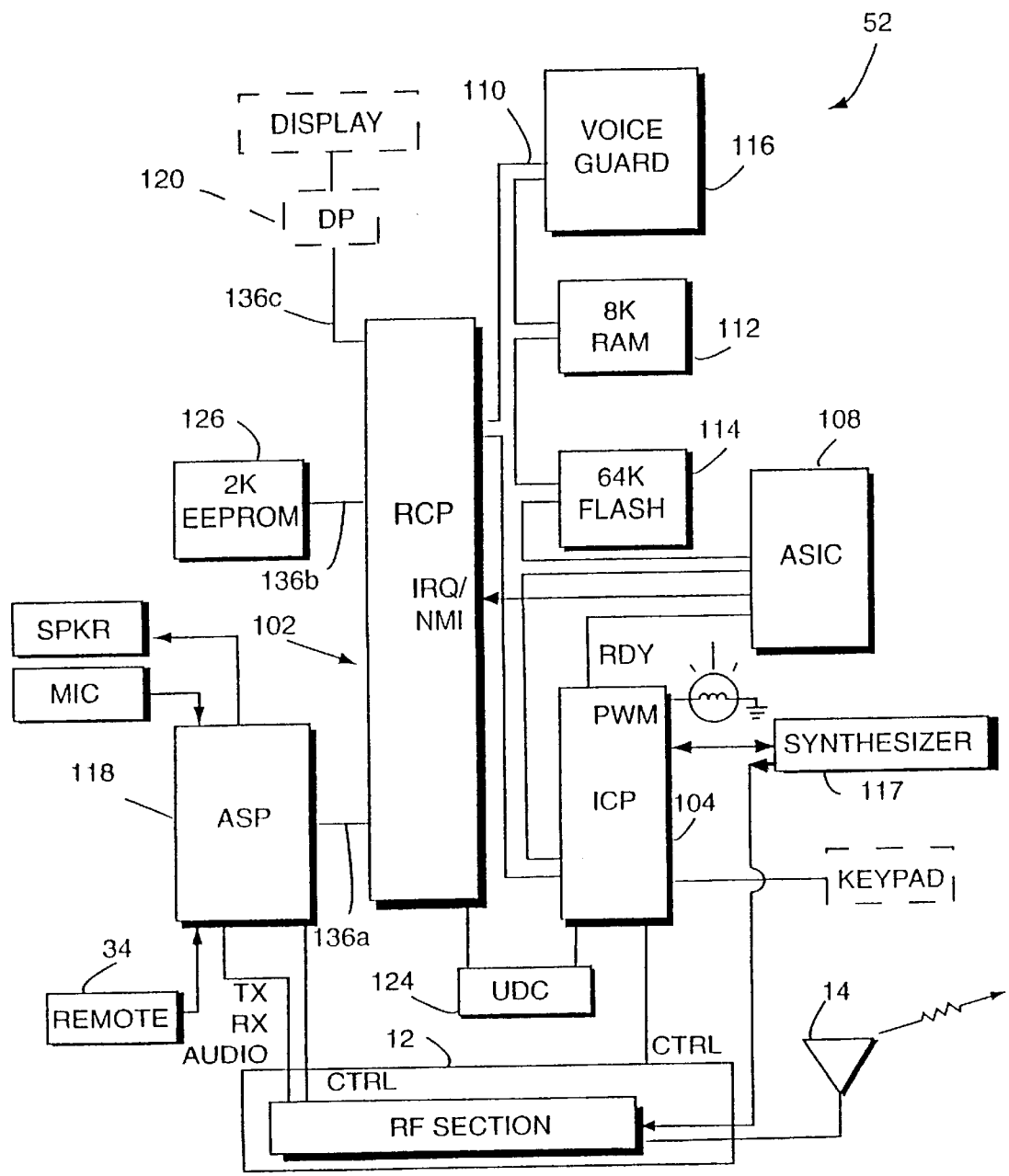
FIG. 1 is a high level block diagram of an exemplary architecture of electronics for the portable radio according to the present invention.

FIG. 1 is a block diagram showing the hardware configuration of a portable radio such as the Ericsson M-RK Portable Radio manufactured and sold by Ericsson, Inc. of Lynchburg, Va., an example of which is disclosed in commonly-owned U.S. Pat. No. 5,487,181, the disclosure of which is hereby incorporated by reference. Although the M-RK radio structure is particularly suitable for the body conformal radio according to the invention, those of ordinary skill in the art will contemplate other architecture that would be suitable for the concepts of the present disclosure, such as the architecture of the Ericsson Prism (HP) Portable Radio. The invention is not meant to be limited to the illustrated portable radio as the structure illustrated in FIG. 1 is merely an example of a hardware configuration that is compatible with the features of the present invention.

FIG. 1 is a schematic diagram of an exemplary architecture of a radio main unit 52. The main unit 52 includes a high-powered radio control processor ("RCP") 102; a lower-power interrupt control processor ("ICP") 104; and a custom application specific integrated circuit ("ASIC") 108. RCP 102, ICP 104 and ASIC 108 communicate with one another via a general-purpose conventional address/data bus 110. Also connected to the bus 110 are a random access memory 112, a flash memory 114, and a digital voice guard block 116, all of conventional design. The voice guard module 116 provides encrypted voice communications. This module is of conventional design and communicates with the RCP 102 via the address/data bus 110.

The RCP 102 in the preferred embodiment comprises a Hitachi H8/532 micro-control unit. The RCP 102 is a high performance CPU coordinating all of the functions of the main unit 52. The ICP 104 in the preferred embodiment is a Hitachi H8/330 single chip micro-computer which acts as a smart interrupt control unit for the RCP 102.

The main unit 52 further includes a custom audio signal processor (ASP) 118 of conventional design that handles most of the audio filtering for the radio. The ASP 118 may be a single chip device that is capable of powering down unused circuitry while continuing to generate alert tones. This allows the RCP 102 to "sleep" while the alert tones are being generated, for example.

The ICP 104 handles the user interfaces, performs tone decoding, and controls the radio frequency synthesizer 117. The ASIC 108 contains circuitry that handles the transmission and reception of digital information over the air. The ASIC 108 further includes interrupt control circuitry, clock control circuitry and address decode logic.

The main unit 52 further includes an optional display processor 120 connected to an LCD display. The display processor 120 in the preferred embodiment comprises an intelligent LCD display control unit of conventional design including a four-bit micro-control unit and integral LCD driver. This approach off loads many of the tedious display functions from the RCP 102.

A transceiver or RF section 12 performs all of the radio frequency signal processing within the main unit 52. The RF section 12, for example, modulates a radio frequency signal (generated at a frequency controlled by the frequency synthesizer 117 under the control of the ICP 104) with audio received from the ASP 118 (or digitized audio received from the voice guard block 116). The RF section 12 transmits such modulated RF signals over the air via an antenna 14. The RF section 12 receives and detects RF signals at frequencies selected by the synthesizer 117 and provides the detected audio to the ASP 118 for filtering and further processing. A microphone, loud speaker and associated amplification circuitry are used to convert a user's speech into audio signals and to convert received audio into sound for listening by the user and together with the display and key pad form the control unit 16 of the body conformal radio.

A universal device connector ("UDC") 124 provides a digital serial port for coupling with the outside world. The UDC 124 may be used, for example, to load new "personality" programming into the radio from an external programming source. Such "personality" defining data specifies, for example, frequencies of operation, radio identification, group and individual IDs, and the like.

Figure 2:
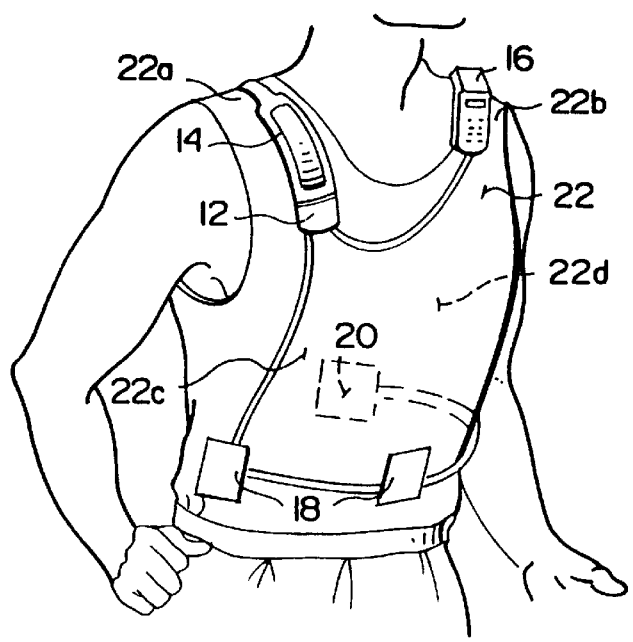
FIG. 2 illustrates the body conformal configuration of the portable radio according to the invention.

The hardware components and the configuration of the body conformal radio according to the present invention are illustrated in FIG. 2. In general, the body conformal portable radio includes the transceiver 12, a patch antenna 14 attached to the transceiver 12, a control unit 16 including the radio key pad, speaker, microphone, talk button, etc., and a power supply 18. Optional auxiliary devices 20 may be connected to the transceiver 12, which may also be connected through the power supply 18, including, for example, a GPS unit that is programmed to poll GPS satellites at a predetermined time interval and store the coordinates in the radio's memory—the stored coordinates could then be transmitted when an emergency has been declared; a heart rate monitor either worn around the chest or wrist, which could be used in conjunction with the radio such that the radio could transmit the user's vital signs to the dispatcher or command post; or a micropower impulse radio (MIR) that is capable of determining the distance and direction of objects. The power supply 18 could be used to operate night vision goggles, a parabolic microphone or a stun gun. Finally, the auxiliary device 20 may include a helmet suite that is provided with a helmet display that displays radio parameters and a speaker that is disposed adjacent a user's ear. In a preferred arrangement, the components of the radio are particularly configured mounted to a user wearable vest 22 that includes a first shoulder section 22a, a second shoulder section 22b, a front portion 22c and a back portion 22d.

Figure 3:
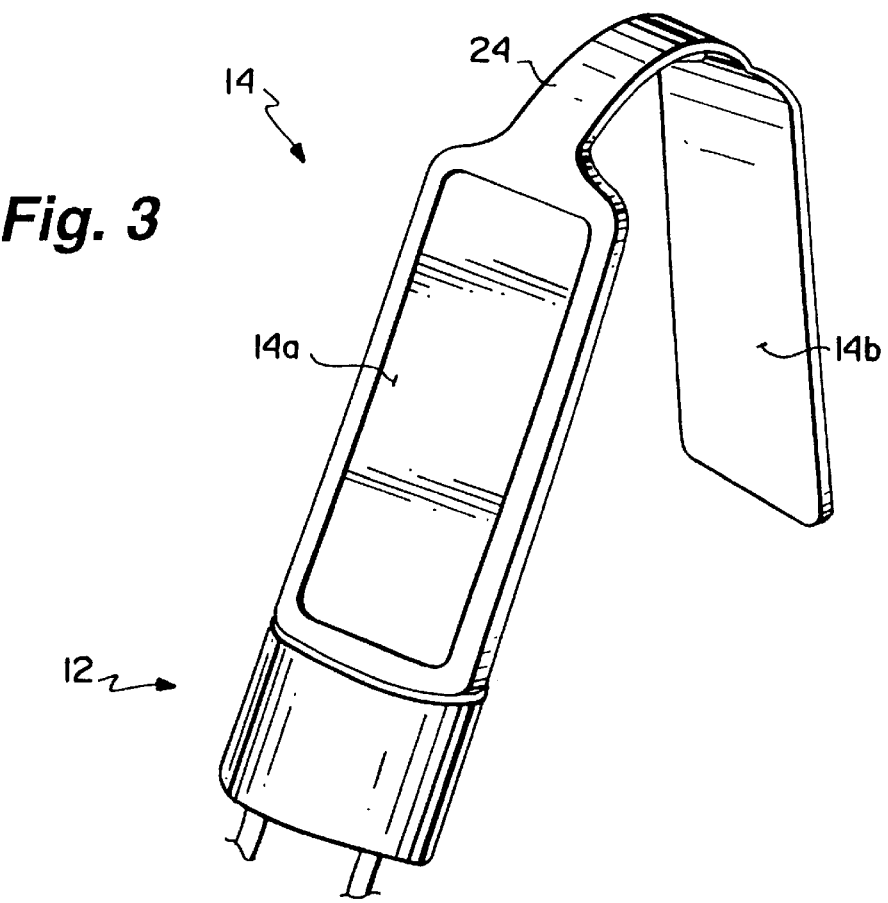
FIG. 3 is a perspective view of the patch antenna according to the invention.

As shown in FIG. 3, the transceiver 12 is attached to the antenna 14 and mountable on a first shoulder of a user (see FIG. 2). The antenna 14 utilizes a known patch antenna structure, including a front patch antenna 14a and a rear patch antenna 14b connected by a shoulder strap 24. The patch antenna 14 eliminates transmission errors from interference caused by a user's body. The separate patches 14a, 14b may work in cooperation or independently, and in the latter instance, the transceiver further enhances the patch antenna performance by acting as a mini-votor, choosing the antenna patch (front versus back) with the strongest signal. As shown in FIG. 2, the patches are mountable over the first shoulder section 22a of the vest 22 over both the front portion 22c and the back portion 22d. Transmit and receive signaling is improved because the patch antenna 14 is physically higher than the traditional whip antenna.

Figure 4:
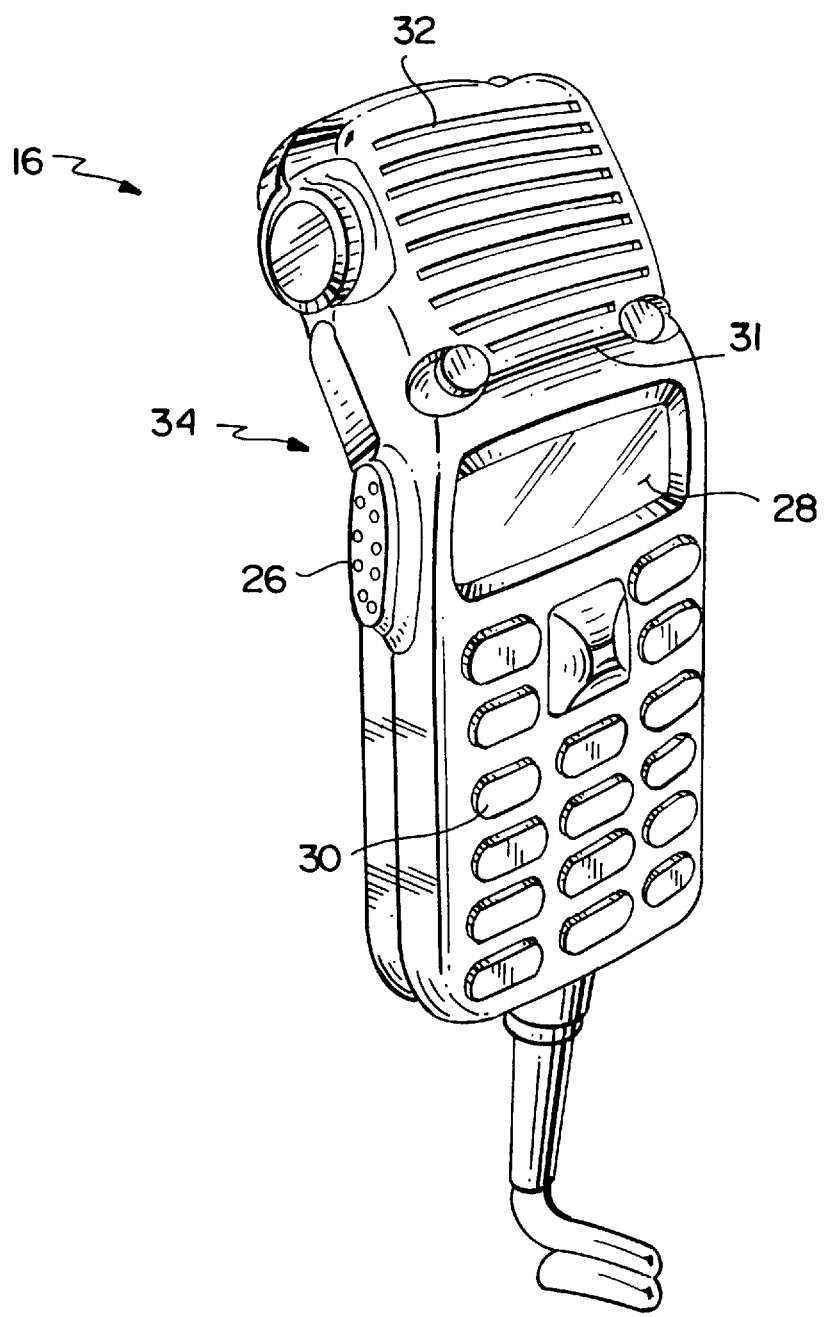
FIG. 4 is a perspective view of an exemplary control unit.

Referring to FIG. 4, the control unit 16 is provided with a talk button 26, a display 28, a key pad 30, a microphone 31, and a speaker 32. The control unit 16 is preferably mounted on a user's second shoulder attached to the second shoulder section 22b of the vest 22. Components of the control unit are quickly and easily accessible by virtue of the proximity to the user's ear and mouth. In a preferred configuration, the control unit 16 is bent at an intermediate portion 34 thereof to facilitate attachment of the control unit to the user's second shoulder and to optimize the position of the speaker relative to the user's ear.

Referring to FIG. 2, the power supply 18 includes at least two battery packs mountable on opposite sides of the user's waist. Additional battery packs may be provided for extended user times about the user's waist attached to the front portion 22c and/or back portion 22d of the vest 22.

The radio according to the invention may also include a programmable remote mic activator 34 to provide remote activation of the control unit microphone when the user's hands are occupied. An infrared PTT (push-to-talk) could be mounted on a glove at the base of the index finger and activated with the user's thumb, or the remote PTT could be mounted on a gun grip or a flashlight handle.

The body conformal radio according to the invention distributes the radio components about a user's body using the user's body as a vehicle for the radio. The components can be comfortably worn under the user's clothing for improved comfort and less cumbersome operation. In addition, the body conformal radio according to the invention improves radio use efficiency and enhances safety.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A portable radio comprising:
    a transceiver;
    a patch antenna attached to said transceiver and mountable on a first shoulder of a user;
    a control unit spaced from and operatively coupled with said transceiver and positioned relative to said patch antenna so as to be mountable on a user's second shoulder, said control unit effecting receipt and transmission of signals via said antenna and said transceiver and including at least one of a talk button, a display, a keypad, a microphone and a speaker; and
    a power supply spaced from and operatively coupled with said transceiver and mountable in the vicinity of a user's waist.

2. A portable radio according to claim 1, wherein said patch antenna comprises two spaced patches connected by a shoulder strap such that said two spaced patches are mountable over both front and back sides of the user's first shoulder.

3. A portable radio according to claim 1, wherein said control unit is bent at an intermediate portion thereof.

4. A portable radio according to claim 1, wherein said power supply comprises at least two battery packs mountable on opposite sides of the user's waist.

5. A portable radio according to claim 1, wherein said power supply comprises a plurality of battery packs mountable about the user's waist.

6. A portable radio according to claim 1, further comprising a user wearable vest supporting said transceiver, said patch antenna, said control unit and said power supply in respective positions on the user's body.

7. A portable radio according to claim 6, wherein said patch antenna comprises two spaced patches connected by a shoulder strap secured to said user wearable vest such that said two spaced patches are mountable over both front and back sides of the user's first shoulder.

8. A portable radio according to claim 1, further comprising remote mic activator means for remotely activating said control unit.

9. A portable radio according to claim 1, further comprising a GPS unit operatively coupled with said transceiver that polls GPS satellites at a predetermined time interval and stores coordinates in a memory.

10. A portable radio according to claim 1, further comprising a heart rate monitor operatively coupled with said transceiver and mountable around one of a user's wrist and chest.

11. A portable radio according to claim 1, further comprising at least one auxiliary device operatively coupled with said transceiver, said at least one auxiliary device drawing power from said power supply.

12. A portable radio according to claim 11, wherein said auxiliary device comprises night vision goggles.

13. A portable radio according to claim 11, wherein said auxiliary device comprises a parabolic microphone.

14. A portable radio according to claim 11, wherein said auxiliary device comprises an incapacitating stun gun.

15. A portable radio according to claim 1, further comprising a helmet suite operatively coupled with said transceiver, said helmet suite including a helmet display that displays radio parameters and a speaker that is disposed to be adjacent a user's ear.

16. A harness portable radio that is configured to conform to a user's body, the harness portable radio comprising:
    a vest having a first shoulder section and a second shoulder section for each shoulder of the user, a front portion and a back portion;
    a patch antenna attached to said first shoulder section;
    a transceiver attached to said patch antenna;
    a control unit spaced from and operatively coupled with said transceiver and attached to said second shoulder section, said control unit effecting receipt and transmission of signals via said antenna and said transceiver and including at least one of a talk button, a display, a keypad, a microphone and a speaker; and
    a power supply spaced from and operatively coupled with said transceiver and attached to one of said front portion and said back portion in the vicinity of a user's waist.

17. A harness portable radio according to claim 16, wherein said patch antenna comprises two spaced patches connected by a shoulder strap, said shoulder strap being attached to said first shoulder section such that said two spaced patches are mountable over both said front portion and said back portion surrounding said first shoulder section.

18. A harness portable radio according to claim 16, wherein said control unit is bent at an intermediate portion thereof.

19. A harness portable radio according to claim 16, wherein said power supply comprises at least two battery packs attached to said front portion and said back portion in the vicinity of a user's waist.

20. A method of constructing a portable radio including a transceiver, a patch antenna, a control unit, and a power supply, the method comprising:
    (a) providing a wearable support having a first shoulder section and a second shoulder section for each shoulder of the user, a front portion and a back portion;
    (b) attaching a patch antenna to the first shoulder section;
    (c) attaching a transceiver to the patch antenna;
    (d) operatively coupling the control unit with the transceiver and attaching the control unit to the second shoulder section, the control unit effecting receipt and transmission of signals via the antenna and the transceiver; and
    (e) operatively coupling the power supply with the transceiver and attaching the power supply to one of the front portion and the back portion in the vicinity of a user's waist.

21. A method according to claim 20, wherein step (b) is practiced by providing two patches connected by a shoulder strap and attaching the shoulder strap to the first shoulder section such that the two spaced patches are mountable over both the front portion and the back portion surrounding the first shoulder section.

22. A method according to claim 20, wherein the power supply comprises a plurality of battery packs and wherein step (e) is practiced by attaching the plurality of battery packs about the front portion and the back portion in the vicinity of the user's waist.

23. A portable radio comprising:

a transceiver;

a patch antenna attached to said transceiver and mountable on a first shoulder of a user, said patch antenna comprising two spaced patches connected by a shoulder strap such that said two spaced patches are mountable over both front and back sides of the user's first shoulder;

a control unit spaced from and operatively coupled with said transceiver and mountable on a user's second shoulder, said control unit including at least one of a talk button, a display, a keypad, a microphone and a speaker; and a power supply spaced from and operatively coupled with said transceiver and mountable in the vicinity of a user's waist.

24. A harness portable radio that is configured to conform to a user's body, the harness portable radio comprising:

a vest having a first shoulder section and a second shoulder section for each shoulder of the user, a front portion and a back portion;

a patch antenna attached to said first should section, wherein said patch antenna comprises two spaced patches connected by a shoulder strap, said shoulder strap being attached to said first shoulder section such that said two spaced patches are mountable over both said front portion and said back portion surrounding said first shoulder section;

a transceiver attached to said patch antenna;

a control unit spaced from and operatively coupled with said transceiver and attached to said second shoulder section, said control unit including at least one of a talk button, a display, a keypad, a microphone and a speaker; and a power supply spaced from and operatively coupled with said transceiver and attached to one of said front portion and said back portion in the vicinity of a user's waist.

25. A method of constructing a portable radio including a transceiver, a patch antenna, a control unit, and a power supply, the method comprising:

(a) providing a wearable support having a first shoulder section and a second shoulder section for each shoulder of the user, a front portion and a back portion;

(b) attaching a patch antenna to the first shoulder section, wherein step (b) is practiced by providing two patches connected by a shoulder strap and attaching the shoulder strap to the first shoulder section such that the two spaced patches are mountable over both the front portion and the back portion surrounding the first shoulder section;

(c) attaching a transceiver to the patch antenna;

(d) operatively coupling the control unit with the transceiver and attaching the control unit to the second shoulder section; and (e) operatively coupling the power supply with the transceiver and attaching the power supply to one of the front portion and the back portion in the vicinity of a user's waist.

* * * * *